June 19, 1962     S. A. MAHR     3,039,630
MANURE REMOVAL APPARATUS
Filed May 26, 1959     2 Sheets-Sheet 1
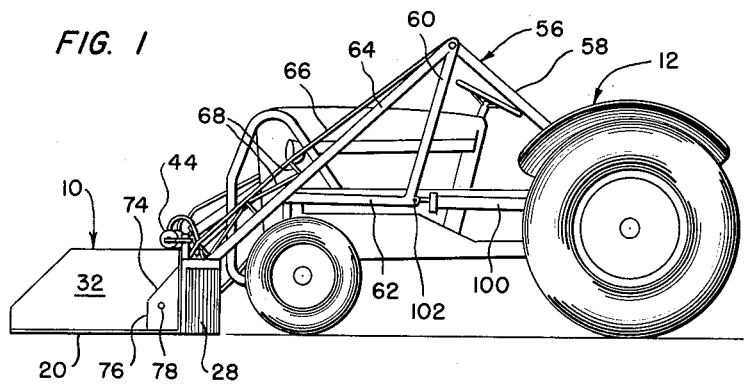
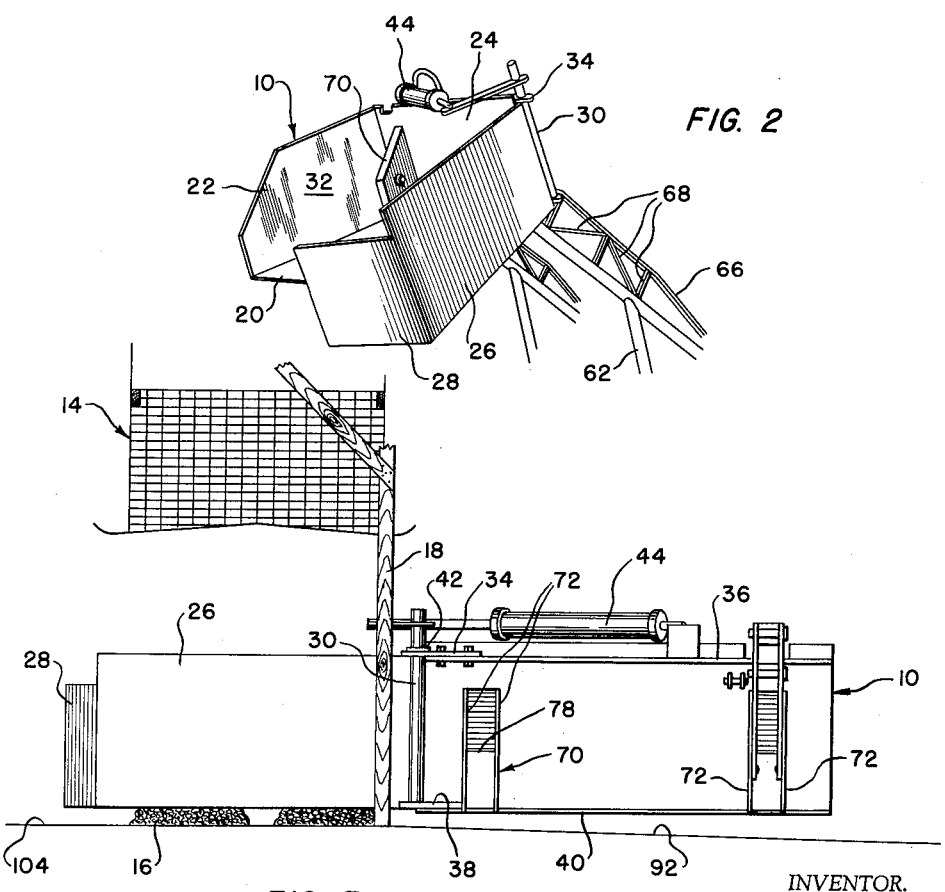
INVENTOR.
STANLEY A. MAHR
ATTORNEYS

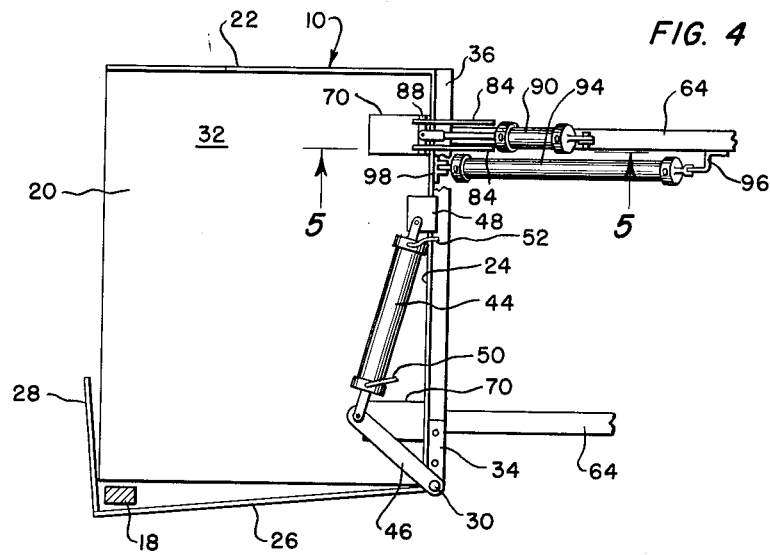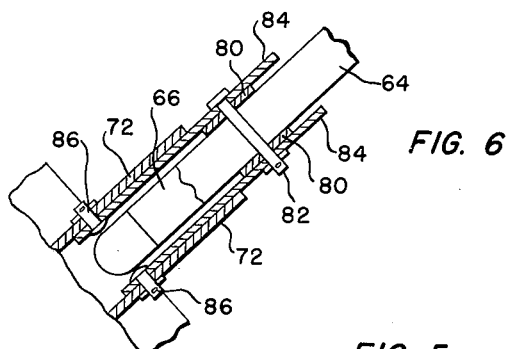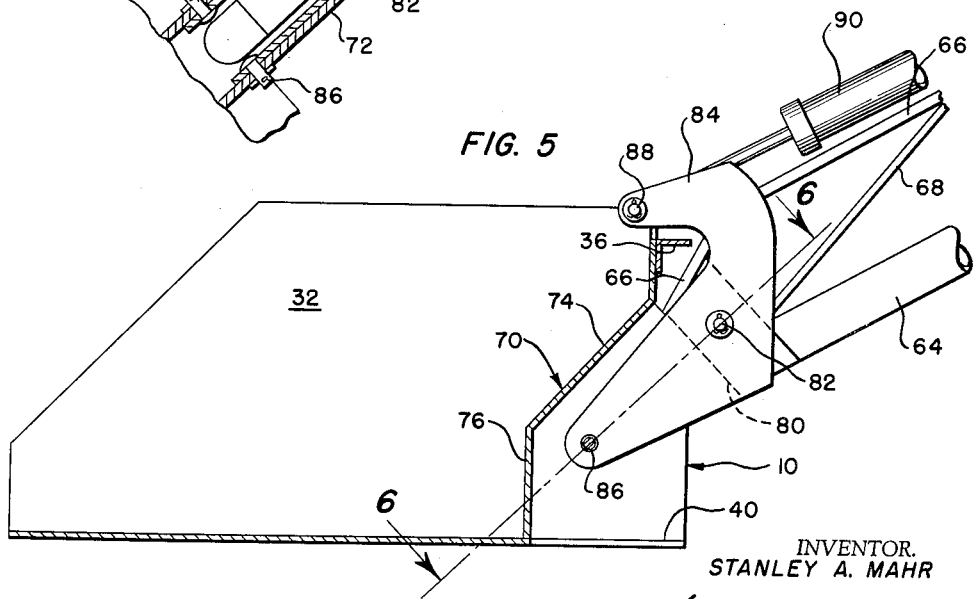

_United States Patent Office_ 3,039,630
Patented June 19, 1962

3,039,630
MANURE REMOVAL APPARATUS
Stanley A. Mahr, P.O. Box 306, San Marcos, Calif.
Filed May 26, 1959, Ser. No. 815,892
3 Claims. (Cl. 214—145)

The present invention relates to manure removal apparatus.

According to the present invention, there is provided an apparatus which is particularly adapted to remove the manure which accumulates over a period of time beneath fowl cages. Such manure has commercial value and is periodically collected and dumped into trucks or the like for transport to the user. On large poultry farms this collection has been a problem because of the manner of construction and the location of the poultry cages. Customarily the cages are supported above the ground by a plurality of spaced posts or stanchions so that the feeding bins or compartments for the poultry, and the egg delivery chutes, are at a convenient height for a person to reach. The cages are constructed of open mesh material sufficiently closely spaced to support the poultry but open enough to permit the poultry droppings to fall from the cage and collect on the ground beneath.

The posts and stanchions have made it difficult to maneuver conventional scoopers and loaders in the confined space beneath the cages so that manure removal has ordinarily been made by men with hand shovels. This is obviously a slow, tedious, and disagreeable task and various mechanical alternatives have been proposed. However, these alternatives have proved to be bulky, expensive, and not completely effective to quickly and expeditiously remove the collected manure.

The apparatus of the present invention is adapted to be carried by a vehicle such as a tractor so that the apparatus may be located at any point along the length of one of the rows of poultry cages. Often there is a paved inclined strip extending along the sides of the cages, and the tractor is conveniently moved along this strip to position the present apparatus.

The present removal apparatus includes a main receptacle which has an open front side and an inner side section which is actuable to swing inwardly and outwardly. The pivotable side section is preferably pivoted at a corner of the main receptacle and includes a forwardly disposed, transversely extending portion which closes off a portion of the open front side of the main receptacle when the pivoted side is in its closed position. With this construction the side section may be pivoted to swing outwardly and beneath the poultry cages to scrape the manure over and onto the main receptacle. Thus, the pivotable side section of the receptacle serves not only as a scraper or collector but also, in its closed position, as a retaining wall for the main receptacle.

Mechanism carried by the vehicle is utilized for raising and lowering the main receptacle and its associated pivotable side to thereby position the pivotable side adjacent the manure piles as the vehicle or tractor proceeds down the line of poultry cages. Additional mechanism is provided for tipping the main receptacle so that in its raised position the receptacle is positioned to dump its contents through its open front side and into a truck or the like for transport of the manure elsewhere. These mechanisms for raising and lowering and tipping the receptacle are preferably hydraulically actuated, as is the mechanism which is actuable to swing the pivotable side of the receptacle in and out. Further hydraulic mechanism is provided for leveling the receptacle with respect to the surface over which it must operate.

It will be seen that the present manure removal apparatus is relatively inexpensive to construct and easy to operate, and is quickly detachable from the vehicle to which it is attached so that the vehicle may be employed for other tasks.

Other objects and features of the present invention will be readily apparent to those skilled in the art from the following specification and appended drawings wherein is illustrated a preferred form of the invention, and in which:

FIGURE 1 is a side elevational view of the apparatus of the present invention, the apparatus being illustrated in lowered position and in association with a tractor, and with the swinging door portion in an open position;

FIGURE 2 is a perspective view of the apparatus of FIGURE 1, illustrating the apparatus in its raised and tipped position;

FIGURE 3 is an elevational view, looking forward, illustrating the receptacle in position to remove manure from beneath poultry cages;

FIGURE 4 is a plan view of the apparatus of FIGURE 1;

FIGURE 5 is a view taken along line 5—5 of FIGURE 4; and

FIGURE 6 is a view taken along line 6—6 of FIGURE 5.

Referring now to the drawings, and particularly to FIGURES 1 through 3, there is illustrated a manure removal apparatus, according to the present invention, which is generally designated 10. Apparatus 10 is adapted to be detachably connected to the front end of a vehicle, such as a tractor 12 or the like, whereby apparatus 10 may be moved by tractor 12 along the side of a row of poultry cages 14. As illustrated, apparatus 10 enables the operator thereof to gather manure 16 from beneath poultry cages 14 for deposit in a truck or the like (not shown) for transportation elsewhere. The stanchions or posts 18 which serve to support poultry cages 14, together with the comparatively small overhead clearance between the bottom of the cages 14 and the ground, heretofore made it difficult for large vehicles such as tractors and the like to operate beneath cages 14. In contrast, apparatus 10 is operative to reach beneath cages 14 to scoop manure 16 from beneath cages 14 and on to the main body portion of apparatus 10.

Apparatus 10 includes a bottom wall 20 to which is welded a side wall 22 and a rear wall 24. In addition, a swinging side 26 is pivotally supported to rear wall 24, and is adapted to swing outwardly to scoop or scrape manure 16 onto bottom wall 20. Swinging side 26 includes a forward plate 28, which is welded to the forward edge of side wall 26, and, at its rearward edge, side wall 26 is welded to a vertically disposed shaft 30. As best illustrated in FIGURES 2 and 4, when swinging side 26 is in its inward or closed position, members 20, 22, 24, 26, and 28 form an upwardly open receptacle or bucket for holding manure. A portion of the front of this bucket, which bucket is hereinafter designated 32, is open where wall 28 does not extend across to side wall 22.

Shaft 30 may be rotatably supported by rear wall 24 in any suitable manner, and has been found to operate satisfactorily when it is constructed as a rigid shaft which is rotatably disposed through an opening provided in a metal mounting tab 34 which is rigidly bolted or otherwise secured to a rearwardly disposed flange 36 formed in, or welded to the rear face of rear wall 24 of bucket 32. The lower end of shaft 30 is oscillatively carried in a bore (not shown) which is provided in a lower mounting tab 38 which is rigidly welded to a rearwardly disposed, lower flange 40 which is formed in, or welded to the rear face of wall 24 of bucket 32. Flanges 36 and 40 not only serve to mount various elements of the present apparatus, but also serve to strengthen and rigidify apparatus 10. A collar 42 is provided in the upper portion of shaft 30 in order to vertically orient swinging side 26 with the rest of bucket 32.

Swinging side 26 is moved inwardly and outwardly by a double acting hydraulic motor 44 which is pivotally secured at one end to a lever 46 which is welded to shaft 30. At its other end, motor 44 is pivotally secured to a mounting tab 48 which is welded to rear wall 24 and flange 36, and when motor 44 is operated by feeding and draining hydraulic fluid through lines 50 and 52, swinging side 26 will be moved inwardly and outwardly with respect to the other parts of the bucket 32. The hydraulic means, including valves, reservoirs, and pumps, used to operate motor 44 are well known in the art.

Bucket 32 is carried at the forward end of tractor 12 upon support means 56 which includes a welded framework formed of a pair of rearward side struts 58, only one of which is shown in FIGURE 1, which are integrally secured together at their upper ends by a horizontally disposed strut (not shown). This horizontal strut serves to pivotally carry a welded framework formed of a pair of side struts 60 which are welded at their lower ends to a pair of substantially horizontally disposed struts 62. The upper ends of struts 60 are welded to a pair of side struts 64 which in turn are welded to the forward ends of struts 62, respectively. In addition, each of the pair of struts 64 is strengthened against bending by a truss-like arrangement of tubing 66 which is welded at its ends to strut 64, and which is spaced from strut 64 substantially at its midportion by elements 68. Only one of these various pairs of struts and side elements is illustrated in FIGURE 1.

The forward ends of struts 64 are disposed within housings 70 which are formed in the rear wall 24 of bucket 32 by welding together side sections 72, and inclined upper section 74, and a forward section 76. It is noted that flange 40 and bottom wall 20 are cut away in the area defined between forward section 76 and side sections 72 of housings 70. As will be apparent, bucket 32 pivots on a lateral axis about the ends of strut 64, and housings 70 merely afford a means to permit mounting bucket 32 for such pivotal movement about struts 64 while yet affording clearance for the relative movement between bucket 32 and struts 64.

Viewed from the driver's seat of tractor 12, the left strut 64, which is the lower strut in FIGURE 4, is pivotally secured to side sections 72 of housing 70 by pin 78. The other strut 64, FIGURES 4 through 6, is secured to bucket 32 in a somewhat different fashion as compared to the securement of the strut 64 just described. This right strut 64 carries a pair of brackets 80 (one of which is shown in dotted outline in FIGURE 5), these brackets being rigidly secured, as by welding, at either side of strut 64, FIGURE 6. It will be noted that brackets 80 are welded to strut 64 somewhat rearwardly of the forward end of strut 64, and a pin 82 is rotatably disposed through brackets 80 and through a pair of cheek plates 84 carried adjacent brackets 80. Cheek plates 84 are substantially C-shaped in configuration and are pivoted at approximately their midportion to pin 82, and are pivotally secured at their lower ends by a pair of pins 86 which are disposed through side sections 74 of housing 70. It will be noted from FIGURE 6 that the forward end of strut 64 is free to move within housing 70. The upper extremities of cheek plates 84 are pivotally secured to a pin 88 which is secured to the forward end of a piston rod of a double acting hydraulic motor 90.

With this arrangement, operation of motor 90 so as to extend its piston rod will move pin 88 downwardly and pivot cheek plates 84 about pin 82 which is secured to strut 64 by plates 80. This pivotal movement of cheek plates 84 will urge pins 86 downwardly, and hence move the right side of bucket 32 downwardly. Since this arrangement is not present at the left side of bucket 32, bucket 32 will angle downwardly on the right side. The holes for pins 78, 82 and 86 are large enough to permit tilting of the sides of the bucket relative to one another. This looseness between the pins and holes is shown exaggerated in FIG. 5 for pin 86. In similar fashion, when motor 90 is operated to bring its piston rod inwardly, the right side of bucket 32 will be tilted upwardly. In this way, bucket 32 may be arranged so that its swinging side 26 will always sweep or scrape in the plane of the surface whereon the material to be removed is located, and this will be the case regardless of the slope or inclination of the surface upon which the vehicle or tractor 12 is located. Surface 92, FIGURE 3, is illustrated by way of example.

Struts 64 thus serve to support bucket 32 at either side, and it will be noted that bucket 32 is free to pivot about pins 78 and 86 but for the provision of a double acting hydraulic motor 94 which is rigidly secured, FIGURE 4, by a bracket 96 to strut 64. The piston rod of motor 94 is pivotally secured to a bracket 98 which is welded to flange 36. As will be apparent, actuation of motor 94 serves to tilt bucket 32 about a lateral axis extending between pins 86 and pin 78. This dumps the contents of bucket 32.

Bucket 32 is raised and lowered by the raising and lowering of struts 64 which is accomplished through the actuation of a hydraulic motor 100, FIGURE 1, which is preferably double acting, and which is pivotally secured to the frame of tractor 12 by suitable structure (not shown). The piston rod of motor 100 is pivotally secured at 102 to the junction of struts 60 and 62, and when the piston rod is urged outwardly it will be seen that struts 64 will be moved upwardly.

In operation, the driver of tractor 12 maneuvers tractor 12 to a position closely adjacent the line of posts 18 extending along a row of poultry cages 14, FIGURE 3. Motor 44 is operated to open swinging side 26 to the position illustrated in FIGURE 3. Motor 90 is then operated to align the lower scraping edge of side 26 with the surface 104 upon which manure 16 is located. Thereafter cylinder 100 is operated to lower swinging side 26 to a position just barely clearing surface 104.

Motor 44 is then operated to swing side 26 over surface 104 to bring manure 16 onto bottom wall 20. The tractor 12 is then moved forward and the operation repeated until bucket 32 is full. Then motor 100 is operated to raise bucket 32, and next the cylinder 94 is operated to tip bucket 32 forward to dump the contents thereof into a truck (not shown).

In scraping manure 16 into bucket 32 the novel construction of bucket 32 uniquely adapts apparatus 10 to clear manure 16 from around posts 18. Thus, in FIGURE 4, it will be seen how swinging side 26 may be operated to first clear manure 16 from the right side of post 18, then the rear side of post 18, as illustrated, and subsequently the left side of post 18 as best illustrated in FIGURE 3.

From the description hereinabove made, it will be apparent that an apparatus has been provided which is straightforward in design, easy to construct and operate, and relatively inexpensive to manufacture. It is effective to quickly and efficiently accomplish the removal of manure, and is readily removable from tractor 12 by merely disconnecting the hydraulic lines, pins 78, 82, 88, and motor 94. This frees tractor 12 for other uses.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:
1. Manure removing apparatus adapted to be connected to a vehicle including:
(a) support means; and
(b) means for raising and lowering said support means; said apparatus comprising:

(c) a bucket carried by the support means,
(d) said bucket including a bottom wall,
(e) a rear wall,
(f) a side wall,
(g) said bottom, rear and side walls being fixed relative to one another,
(h) said receptacle including a second side wall forming a scraper,
(i) means at the rear of said second side wall for pivotally attaching the same to the rear wall;
(j) a motor carried by the receptacle; and
(k) and means connected with the motor for oscillating said second side wall about the pivot means.

2. Manure removing apparatus as defined in claim 1, characterized in that:

(l) means forming a horizontally extending pivot for pivotally supporting the bucket by the support;
(m) a motor carried by the supporting means; and
(n) means connected with the last mentioned motor for oscillating the bucket about the last mentioned pivot means.

3. Manure removing apparatus as defined in claim 1, characterized to include:

(o) means for tilting one side of the bucket relative to the other side.

References Cited in the file of this patent

UNITED STATES PATENTS

| | | |
|---|---|---|
| 2,556,592 | Markkula | June 12, 1951 |
| 2,679,326 | Isaksen | May 25, 1954 |